Oct. 26, 1965   E. E. PRATHER ETAL   3,213,524
METHOD OF MAKING A VALVE POPPET CONSTRUCTION
Original Filed Sept. 12, 1958

INVENTOR.
EDWIN E. PRATHER
GUNTHER PFEIFER
CRAIG E. HAMBIDGE
BY
William P. Hickey
ATTORNEY

United States Patent Office 3,213,524
Patented Oct. 26, 1965

3,213,524
METHOD OF MAKING A VALVE POPPET
CONSTRUCTION
Edwin E. Prather and Gunther Pfeifer, South Bend, Ind.,
and Craig E. Hambidge, Alpena, Mich., assignors to
The Bendix Corporation, South Bend, Ind., a corporation of Delaware
Continuation of application Ser. No. 760,695, Sept. 12,
1958. This application Sept. 21, 1962, Ser. No. 225,421
1 Claim. (Cl. 29—157.1)

This is a continuation of our prior application No. 760,695 filed September 12, 1958, now abandoned.

The present invention relates to a method of producing valve poppets, and more particularly to a valve poppet and/or a method of producing the same which does not require machining of any kind.

A further object of the present invention is the provision of a new and improved method of making a valve poppet in which the poppet is moulded in such a way that no flash will be produced on the surface which supports the washer of resilient valve seat engaging material.

A still further object of the present invention is the provision of a new and improved method of making a valve poppet in which there is a first poppet body section having a flat end face, a second poppet body section having a flat end face, and a washer of resilient valve seat engaging material sandwiched between the flat end faces of the poppet sections, and which poppet sections are held together by a projecting boss on one of the sections which extends into a recess of corresponding configuration in the other of the poppet sections, and which boss is locked in place by an annular ridge located either on the side surfaces of the boss or recess when it is positioned in an annular groove in the other of the side surfaces of the boss or recess.

A still further object of the present invention is the provision of a new and improved method of making a valve poppet in which the ridge that is formed on the sidewalls of either the boss or recess is provided with an interference fit with respect to the sidewalls of the other of the boss or recess, and the body sections containing the boss and recess respectively are formed from a material sufficiently resilient as to permit the body section to deform sufficiently to receive the ridge when the boss and recess are telescoped together, and thereafter return substantially to their initial shape when the ridge reaches the annular groove to lock the sections together.

The invention resides in certain constructions and arrangements and methods of producing the same; and further objects and advantages will become apparent to those skilled in the art to which the invention relates from the following description of several preferred embodiments and methods of producing the same described with reference to the accompanying drawing forming a part of this specification, and in which.

Figure 1:
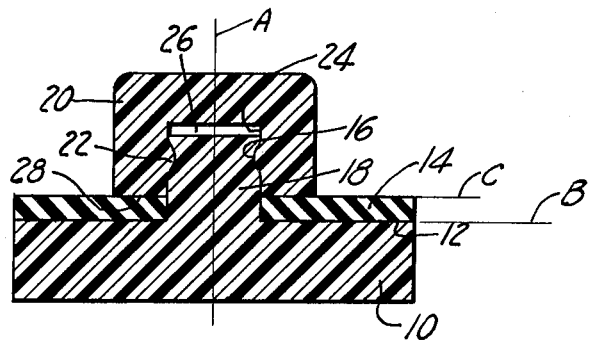
FIGURE 1 is a cross sectional view of one embodiment of the invention, certain details of which are shown in exaggerated form to better depict its construction.

As previously indicated, the present invention relates to a type of poppet construction and/or method of making the same in which a strip of resilient valve seat engaging material is clamped between two sections of a poppet body which are snapped together. The construction contemplated utilizes a washer of valve seat engaging material having an opening therethrough through which a portion of the poppet member extends and which poppet member provides a pair of opposing shoulders or faces to confine and hold the portion of the washer surrounding its central opening. Poppet constructions having opposing shoulders which hold the valve facing material can, of course, be machined from a solid piece of material; and could, of course, be moulded by a single set of dies where the dies were made to separate upon the place passing through the longitudinal centerline A of the poppet. Were such to be done, however, production methods would produce a flash which would extend across the face 12 of the poppet upon which the resilient facing material is seated so that good valve seating could not be had without machining the flash away from the finished moulded product.

In order that the valve poppet might be mounded on a mass production basis without producing a flash across the face 12 of the poppet body behind the resilient valve seat engaging material, the present invention contemplates forming the poppet body in two sections 10 and 20 respectively which are snapped together to provide smooth opposing shoulder surfaces which securely hold the seat engaging material 14 in place. In the preferred method of making the valve poppet shown in FIGURE 1, the poppet section 10 is provided with a generally flat end surface 12 for supporting the strip 14 (in this case a washer) of a resilient valve seat engaging material such as rubber. The section 10 is formed in a pair of separating die means which separate upon a plane B that is parallel and may be co-extensive with the end surface or facing 12. Assuming that the poppet section 10 is cast in the position shown in the drawing, the upper separable die member which forms the face 12 of the poppet section 10 will contain a cylindrical recess therein, the sidewalls of which are provided with an annular projection so as to provide an annular recess 16 in the sidewalls of the boss 18 which projects from and is formed as an integral part of the lower poppet section 10. In order that the solidified boss 18 can be removed from such a die cavity, it will be necessary that a moulding material be used which is sufficiently resilient to permit the boss 18 to deform and flow around the portion of the die which forms the recess 16 as the boss is withdrawn from its die cavity. Numerous plastic materials have this property; and nylon is presently being used in the commercial production of poppets embodying the principles of the present invention. The maximum depth of groove 16 which can be moulded in this fashion, will of course, depend upon the moulding material being used, and in the case of the nylon parts now being manufactured, a recess depth of approximately .005 of an inch is being used.

The upper section 20 of the poppet body shown in FIGURE 1 may be formed in a generally similar manner by a pair of separating dies which separate upon the plane C, and the lower die portion of which will contain a boss which projects upwardly into the cavity of the upper die member, and which boss will contain an annular groove therein so as to form the annular ridge 22 in the finished moulded section 20. The moulding material for the upper part 20 must have similar properties to that used for the lower poppet section 10 so that the ridge 22 can be withdrawn from its die with the ridge 22 intact upon the sidewalls 24 of the hole 26 that is formed within the upper poppet section 20.

The manufacture of the poppet shown in FIGURE 1 is completed by snapping the upper poppet section 20 upon the stem or boss 18 of the lower poppet section 10 with the annular washer of valve seating material 14 positioned about the stem 18 and sandwiched between the surface 12 of the lower poppet section 10 and the end surface 28 of the upper poppet section 20. During the pressing operation of the section 20 onto the section 10, each yields sufficiently to permit the ridge 22 to slide over the end of the boss 18 until it reaches the recess 16 of the lower poppet section 10, whereupon the two poppet sections 10 and 20 substantially resume their shapes as originally cast so that the poppet section 20 becomes locked upon the poppet section 10.

Figure 2:
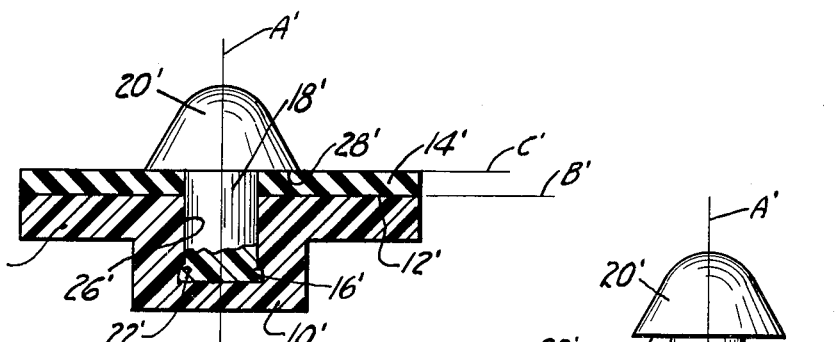
FIGURE 2 is a cross sectional view similar to FIGURE 1 but showing another embodiment of the invention.
Figure 3:
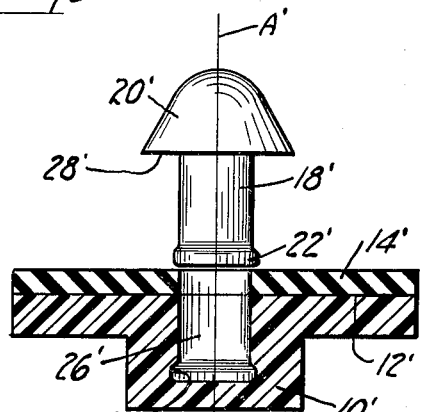
FIGURE 3 is a cross sectional view of the parts of the embodiment shown in FIGURE 2 but in disassebled form prior to their assembly.

The valve poppet embodiment shown in FIGURE 2 is similar in many respects to that shown in FIGURE 1; and those parts in FIGURE 2 which are similar to those shown in FIGURE 1 will be designated by a like reference numeral characterized further in that a prime mark is affixed thereto. One of the differences between the two embodiments is that the hole 26' in the embodiment shown in FIGURE 2 is formed in the lower poppet section 10' while the stem 18' is formed integrally with the top poppet section 20'. Another significant difference is that the ridge 22' is formed integrally on the stem portion 18' while its receiving groove 16' is formed in the sidewalls of the hole 26'. A further significant difference is that the ridge 22' is formed on the very end of the stem portion 18' instead of at a position intermediate its ends, as was done in the embodiment shown in FIGURE 1; and a still further significant difference is that the stem portion 18' in the embodiment shown in FIGURE 2 is accurately formed of predetermined length and the hold 26' is accurately formed of a predetermined depth, so that when the end of the stem portion 18' engages the inner end of the hole 26', the surface 28' of the poppet member 20' will be accurately positioned a predetermined distance from the end face 12' of the lower poppet section 10'.

It is intended that the sections of the poppet shown in FIGURE 2 may be moulded in a manner similar to that recited for the embodiment shown in FIGURE 1. The separable die portions forming the lower poppet section 10' may separate from its upper die portion on the imaginary plane B' coincident with the face 12', and the upper portion of the die would contain a boss which projects into a cavity in the lower portion of the die— which boss would include a ridge corresponding in shape to the ridge 16'. The poppet section 20' may similarly be moulded by a pair of separable die means which separate upon the plane C'. The bottom portion of its die-forming means would contain a recess corresponding in shape to the stem or boss 18' and would include a groove 22' in its sidewalls at its inner end; and its upper die portion would contain a cavity corresponding in shape to the mushroomlike shaped head of the body section 20'. A resilient yielding of the ridge 16' is likewise required in order to extract the poppet portion 20' from its die forming means; as will the poppet section 10' in order to withdraw the portion of the die which forms the recess 22'. The poppet shown in FIGURE 2 is assembled by pressing the poppet section 20' into the poppet section 10' with an annular washer of synthetic rubber 14' positioned therebetween, until the lower end of the stem 18' engages the bottom surface of the hole 26' to position the surface 28' accurately with respect to the surface 12', and in which position the ridge 16' locks into the recess 22'.

Where the poppet members are to be assembled by hand, it will usually be desirable to insert the stem 18 or 18' through the central opening of the facing material 14 or 14', and thereafter insert the stem 18 or 18' into the hole 26 or 26'. The poppet sections 10 and 20, or 10' and 20' as the case may be, can thereafter be forced together until the locking action previously recited is achieved. Where the poppet sections shown in FIGURE 2 are to be assembled by machine on a mass production basis, however, it may be desirable to provide a fixture which will hold the poppet members 10' and 20' aligned in axial relationship, position the facing material 14' upon the face 12' and thereafter force the section 20' toward the poppet portions 10' to cause the stem portion 18' to be forced through the central opening of the facing material 14' and then into the hole 26' until the sections 10' and 20' become locked together. Similarly if the embodiment shown in FIGURE 1 were to be assembled on a mass production basis using a similar arrangement, the poppet portion 20 might be held by a suitable fixture, the facing material 14 would be placed over the poppet portion 20 with its central opening aligned with the hole 26, and thereafter the stem 18 of the poppet section 10 would be forced through the hole of the facing material 14 into the hole 26 of the poppet section 20 in a single pressing operation.

Figure 4:
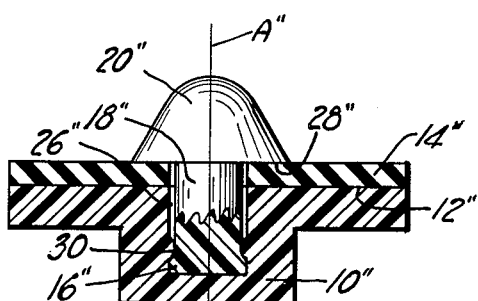
FIGURE 4 is a cross sectional view similar to FIGURE 2 but showing still another embodiment of the invention.

The embodiment shown in FIGURE 4 is generally similar to that shown in FIGURE 2 excepting that each of the side surfaces of the recess 26" and the boss 18" are provided with annular ridges for locking the sections 20" and 10" together. Those portions which are similar to FIGURE 2 will be designated by a like reference numeral characterized further in that a double prime mark is affixed thereto. In some instances the boss 18" may be provided with a diameter which generally corresponds to the opening provided by the ridge 30 in the recess 26" so that only the ridge 16" of the boss 18 will have an interference fit with respect to the ridge 30. In other instances where a more firm locking action is desired, the boss 18" may be provided with a diameter substantially equal to that of the recess 26" so that its ridge 16" will have an interference fit with respect to the sidewalls of the opening 26" as well as with the ridge 30. Under such conditions when the boss 18" is pressed into the recess 26" a very substantial interference or locking action will be provided; and under such conditions, it will be necessary that each of the sections 10" and 20" is provided with sufficient strength to withstand the necessary deformation encountered during assembly of the parts.

It will be seen that all of the embodiments shown in the drawing provide a locking action which is accomplished by means of a pair of opposing and engaging surfaces on the respective sidewalls of a boss and its receiving recess, one of which surfaces faces generally axially inwardly towards the inner end of the recess while the other of the surfaces faces generally axially outwardly of the recess to prevent separation of the sections once they engage each other. For the purposes of the following claims, it is intended that the inner end of the recess 26" inwardly of the projection 30 might be thought of as a recess in the sidewalls of the recess 26" for the reception of the annular projection or ridge 16" on the boss 18".

It will be apparent that the objects heretofore enumerated as well as others have been achieved and that there has been provided a new and improved poppet structure and/or method of producing the same whereby a poppet can be made cheaply and if desired without a finished machining operation.

While several embodiments of the invention have been shown and described in considerable detail, we do not wish to be limited to the particular constructions shown and described; and it is our intention hereby to cover all novel adaptations, modification and arrangements thereof which come within the practice of those skilled in the art to which the invention relates.

We claim:

An inexpensive method of manufacturing a valve poppet comprising the steps of:

providing first and second die members which separate upon a given plane and which together provide a generally disc-shaped cavity having a flat end face generally parallel to said plane, said second die member having a projecting boss of generally uniform cross section extending into said cavity at a right angle to said separating plane, and said boss having a slight annular ridge adjacent its end;

solidifying a plastic material in said cavity provided by said die members to form a first plastic body with a hole therein the sidewalls of which contain an annular recess, said plastic material being of a type which will plastically deform sufficiently to permit said annular ridge of said boss to be withdrawn out of the solidfied material which thereafter substantially returns to its shape as solidified;

pulling said solidified material from said first and second die members and withdrawing said boss from said solidified material;

providing third and fourth die members which separate upon a plane and which together form a cavity having a generally flat end face generally parallel to said separating plane and of different area than that of the flat face of said first and second die members, and which provide a cavity section extending into one of the die members at right angles to said separating plane of a cross section corresponding to that of said boss, said cavity section having an annular groove in its sidewalls generally corresponding in shape to the ridge on said boss but spaced a generally predetermined greater distance from said flat face of said third and fourth die members when assembled than the ridge of said boss is spaced from the flat end face of said first and second die members when assembled;

solidfying plastic material having the above specified properties in the cavity of said third and fourth die members to form a second plastic body having a boss with a ridge therein;

pulling the solidified material from the third and fourth die members with the ridge intact on its boss;

providing an annular washer of resilient material having an area generally corresponding to the largest flat face of said first and second plastic bodies and a central opening corresponding generally in cross section to that of said boss; and pressing the boss of said second plastic body into the hole of said first plastic body with said annular washer positioned about the boss until the ridge on the boss locks into the annular recess in the hole of said first plastic body.

References Cited by the Examiner
UNITED STATES PATENTS

| | | | |
|---|---|---|---|
| 2,142,438 | 1/39 | Faiveley | 29—453 |
| 2,194,961 | 3/40 | Walker | 251—357 X |
| 2,855,206 | 10/58 | Haviland. | |
| 2,861,849 | 11/58 | Case. | |
| 2,889,089 | 6/59 | Herrick et al. | |
| 2,952,439 | 9/60 | Koons | 251—357 |
| 2,987,812 | 6/61 | Donaldson | 29—453 |
| 3,013,308 | 12/61 | Armour | 29—451 |
| 3,053,502 | 9/62 | Brooks | 251—357 |

WHITMORE A. WILTZ, *Primary Examiner.*

LAVERNE D. GEIGER, *Examiner.*